Nov. 26, 1963

G. M. KIRKPATRICK 3,112,452

SIGNAL PROCESSING ARRANGEMENT WITH FILTERS IN PLURAL CHANNELS MINIMIZING UNDERSIRABLE INTERFERENCE TO NARROW AND WIDE PASS BANDS

Filed Dec. 28, 1959

INVENTOR:
GEORGE M. KIRKPATRICK,
BY Michael Masnik
HIS ATTORNEY.

United States Patent Office 3,112,452

Patented Nov. 26, 1963

3,112,452

SIGNAL PROCESSING ARRANGEMENT WITH FILTERS IN PLURAL CHANNELS MINIMIZING UNDESIRABLE INTERFERENCE TO NARROW AND WIDE PASS BANDS

George M. Kirkpatrick, North Syracuse, N.Y., assignor to General Electric Company, a corporation of New York Filed Dec. 28, 1959, Ser. No. 862,115
6 Claims. (Cl. 328—167)

Figure 1:
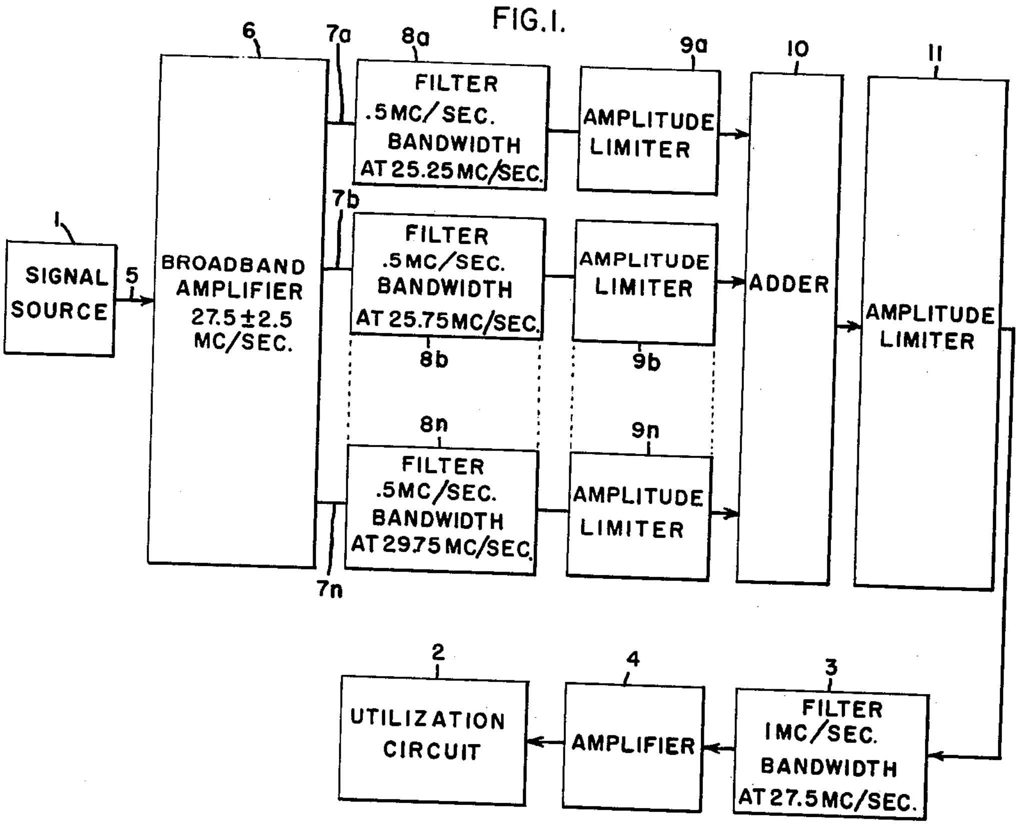

This invention relates to signal processing arrangements and particularly to arrangements for minimizing the effects of undesired or noise signals appearing in the frequency spectrum under surveillance for the occurrence of desired signals.

In the electrical arts there exists a need for processing desired signals occurring in a background of noise or undesired signals. Where the undesired signals occur as narrow spikes, it is common practice to amplitude-limit the desired and undesired signals without frequency discrimination and prior to amplifying the signals in a narrow band channel tuned to the frequency of the desired signals. The broadband amplitude limiting is dimensioned to clip or remove the high amplitude spikes of the undesired noise pulses with negligible effect on the desired signals. The narrow band amplification discriminates against the clipped narrow pulses and enhances the desirable signal output with respect to the noise or undesired signals. Unfortunately, however, where the undesired signals occur as relatively continuous wave or CW signals, the aforementioned process operates to effectively superimpose the desired narrow band signal on the CW signal such that the broad band limiting process operates to adversely affect the desired signal.

It is therefore an object of my invention to provide an improved signal processing arrangement.

It is a further object of my invention to provide a signal processing arrangement which discriminates in favor of desired pulse signals and against CW undesired signals.

It is a further object of my invention to process incoming desired and undesired signals prior to a process of broadband limiting and narrow band amplification in order to enhance the resultant desired signal output with respect to the undesired signal output.

In accordance with one embodiment of my invention, there is provided an arrangement for processing a signal of bandwidth $m\beta/n$ where $m/n$ is less than 1. Means are first provided for amplifying said input signal in an amplifier of bandwidth $\beta$ to derive an amplified signal. Means are next provided for limiting said amplified signal in a plurality $n$ of channels having bandwidths $\beta/n$ wherein said channels are dimensioned in frequency to cover the bandwidth $\beta$. Means are provided for adding said limited signals to provide added limited signals. The added limited signals are then amplitude-limited in a channel having a bandwidth $\beta$. Finally, said last-named limited signals are amplified in a channel having a bandwidth $m\beta/n$ to derive the resultant output signals. The resultant output provides a desired signal which has been enhanced with respect to the undesired signal.

Figure 2:
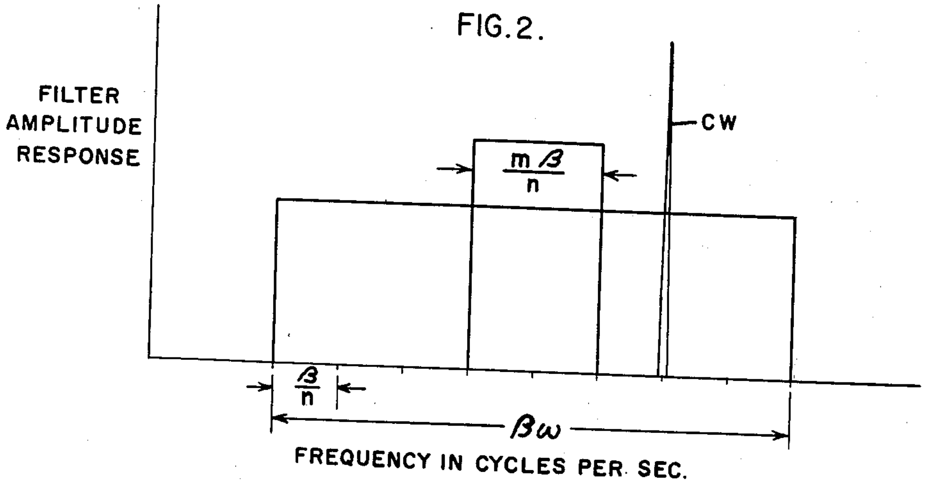

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings wherein:

FIG. 1 illustrates in block diagram form an embodiment of the present invention; and FIG. 2 illustrates graphically certain waveforms useful in describing the operation of the arrangement of FIG. 1.

Referring to FIG. 1 there is shown a source of input signals 1 which contain both desired and undesired signal components. It is desired to process the signals available from 1 such that they appear in a utilization circuit 2 with the desired signal component enhanced relatively to the undesired signal component. Let us assume for illustrative purposes that the desired signal has a bandwidth of 1 megacycle per second centered at 27½ megacycles per second. Also, that accompanying the desired signals are noise signals; as for example a CW signal essentially of a pure sine wave occurring at 29 megacycles per second and random noise pulses of 5 megacycles bandwidth centered, for example, at 27½ megacycles per second. One obvious solution for removing a CW signal essentially of pure sine wave shape would be to introduce a rejection filter centered at 29 megacycles per second. However, this solution would not eliminate or discriminate against the noise pulse signal. On the other hand, where relatively sharp noise pulses are encountered it is common practice to resort to a process involving broad band limiting and narrow band amplification for substantially rejecting such noise pulses. For example, in FIG. 1 the noise pulses available from 1 would be applied to an amplitude limiter 11 which is relatively frequency insensitive but which is adapted to limit only those signals occurring above the amplitude level of the desired signals available from source 1. The clipped noise pulses and the relatively unaffected desired signals would then pass through a narrow band filter 3 which would discriminate against the wider band width noise pulses and enhance the narrow band desired signals such that upon amplification in 4, relatively enhanced desired signals would appear at the utilization circuit 2. Unfortunately, if CW signals should occur along with the desired signals, the process of limiting and amplification in circuits 11, 3 and 4 would operate to limit or remove the desired signals which would be superimposed on the carrier frequency components and thereby operate to discriminate against the desired signals.

In order to provide an arrangement capable of discriminating against both CW and narrow band pulses while relatively unaffecting desired signals, the remaining arrangement of FIG. 1 has been devised. In the arrangement of FIG. 1 signals available from source 1 are supplied over lead 5 to an amplifier 6 having a pass band of 5 megacycles per second centered at 27½ megacycles per second. The output from amplifier 6 is applied over respective leads 7a, 7b, . . . 7n to respective filter circuits 8a, 8b, . . . 8n. The outputs of the respective filter circuits are applied to associated amplitude limiter circuits 9a, 9b, . . . 9n. The outputs of the limiters 9 are applied over respective leads to an adder circuit 10 where the signals are vectorially added. Each of the filter circuits 8 is dimensioned to have a narrow pass band of ½ megacycle per second centered ½ megacycle apart over a bandwidth occurring between 25¼ megacycles per second and 29¾ megacycles per second. Assuming the dimensioning just mentioned, the CW signal of 29 megacycles per second would be discriminated against in all filters 8 except the one having the proper pass characteristic, and appear essentially in its full amplitude at the amplitude limiter 9 associated with this one filter. This amplitude limiter would operate then to clip the level of the high intensity CW signal to a level approximating that of the desired signal. In this manner the CW signal appearing in the adder circuit 10 would have been reduced in intensity from its original value. The CW signal then available from adder circuit 10 would pass through amplitude limiter circuits 11 to the filter circuit 3 without substantially further limiting. The filter 3 is dimensioned to have a pass band of 1 megacycle per second centered at 27½ megacycles per second. Under these circumstances the CW signal at 29 megacycles per second would be further discriminated against with respect to the desired signal before amplification through amplifiers 4 to the utilization circuit 2. However, if the CW signal had occurred within the pass band of the filter 3, such further discrimination would not have occurred. However, sufficient discrimination would have already taken place in the aforementioned filters 8 and limiters 9 such that the desired result is obtained.

The noise pulse components available from the signal source 1 are amplified in amplifier 6 and appear on respective output leads 7a, 7b, . . . 7n. Having a relatively broad bandwith the noise pulse, in passage through filters 8, is broken down into a plurality of pulses having a greater time duration than the original noise pulse but also having a reduced amplitude as well. The net effect is that the output of the filters 8 are essentially unaffected by the amplitude limiter 9 and appear at the adder 10. Upon addition in the adder 10 the original narrow noise pulse is essentially reformed to its original short time duration and relatively high amplitude level. In passing through the limiter 11 the extremely high intensity noise pulse is clipped to approximately the level of the desired signal. The clipped narrow noise pulse is passed through filter circuit 3 and the bandpass action of filter circuit 3 further reduces the clipped noise pulse. Upon amplification in circuit 4 the reduced amplitude noise pulse appears at utilization circuit 2.

The desired signal available from signal source 1 after amplification in circuit 6 appears in respective filters 8a, 8b, . . . 8n. In a manner comparable to that described in connection with the extremely narrow noise pulse the desired pulses are extended in time duration and reduced in amplitude before they appear at the adder 10. Upon addition in 10, the original desired pulse shape and amplitude level is essentially restored. The amplitude clipping level of limiter 11 being dimensioned to discriminate against extreme high intensity noise pulses is dimensioned also to pass the relatively smaller amplitude desired signals without essentially any amplitude limiting. These desired signals pass through filter 3 without essentially any adverse effect such that upon amplification in 4 they appear in the utilization circuit 2. The net effect of the arrangement as thus described is to have limited undesired signals having a relatively small frequency bandwidth, such as CW, and also signals which have a short time duration, such as noise impulses, without adversely affecting the desired signals.

It should be noted that for the example just described, essentially ten limiters were employed in circuits 9 to effect the desired signal discrimination action. Generally speaking, if the input signal has a bandwidth of $m\beta/n$ (see FIG. 2), the ratio $m/n$ is less than 1 and $\beta$ is the bandwith of the input signal source which is dimensioned to pass the noise pulse. Under these circumstances $\beta/n$ number of limiter circuits would be employed to effect the desired signal-to-noise improvement.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. An arrangement for processing a desired signal occurring within a wide frequency bandwidth $\beta$ to limit the effect of a narrow band undesired signal occurring in the wide frequency spectrum comprising a plurality $n$ of different narrow band signal amplifiers each of bandwidth $\beta/n$, each of said amplifiers having a different pass band within said wide frequency spectrum, means for applying said signals in parallel to each of said narrow band amplifiers to derive amplified signals, means for separately amplitude limiting said amplified signals to provide separate limited signals, means for adding said separately limited signals to provide a single resultant output signal means for amplitude limiting said output signal to provide a limited output signal, a narrow band signal amplifier of band width $m\beta/n$ where $n$ is greater than $m$ and $m$ and $n$ are integers, and means for applying said limited output signal to said narrow band signal amplifier of bandwidth $m\beta/n$ to provide amplified limited output signals.

2. An arrangement for processing a desired signal occurring within a wide frequency spectrum to limit the effect of a narrow band undesired signal occurring in the wide frequency spectrum comprising a plurality $n$ of narrow band signal amplifiers, each of said amplifiers having a different narrow pass band within said wide frequency spectrum, means for applying said signals in parallel to each of said narrow band amplifiers to derive amplified signals, means for separately amplitude limiting said amplified signals to provide separate limited signals, means for adding said separately limited signals to provide a single resultant output signal, and means for amplitude limiting said output signal to provide a limited output signal.

3. An arrangement for discriminating against undesired continuous wave signals and undesired narrow pulse signals and in favor of desired pulse signals wherein all of said signals occur in the same frequency bandwidth $\beta$ and said desired signals occupy a bandwidth $m\beta/n$ wherein $m/n$ is less than one, comprising means for amplifying all of said signals in an amplifier of said bandwidth $\beta$ to derive first signals, a plurality $n$ of channels having bandwidths $\beta/n$, which are differently dimensioned in frequency to cover said bandwidth $\beta$, means for applying said first signals to each of said channels in parallel, each of said channels responsive to said applied first signals for amplitude limiting said first signals having an amplitude level above that of said desired signals to derive second signals, means for vectorially adding each of said second signals to derive third signals, an amplitude limiting channel having said bandwidth $\beta$, means for limiting the amplitude of only those third signals having an amplitude level above that of said desired signals comprising means for applying said third signals to said amplitude limiting channel to derive fourth signals, an amplifier having said bandwidth $m\beta/n$, and means for applying said fourth signals through said amplifier to derive fifth signals.

4. An arrangement for discriminating against undesired continuous wave signals and undesired narrow pulse signals and in favor of desired pulse signals wherein all of said signals occur in the same frequency bandwidth $\beta$ and said desired signals occupy a bandwidth $m\beta/n$ wherein $m/n$ is less than one, comprising a plurality $n$ of channels having different frequency pass characteristics which are dimensioned in frequency to cover said bandwidth $\beta$, each of said channels responsive to said first signals for amplitude limiting said first signals having an amplitude level above that of said desired signals to derive second signals, means for vectorially adding each of said second signals to derive third signals, means responsive to said third signals for limiting the amplitude of only those third signals having an amplitude level above that of said desired signals to derive fourth signals, a channel having a pass band width equal to $m\beta/n$, and means for applying said fourth signals to said channel having a pass bandwidth equal to said $m\beta/n$ to produce fifth signals.

5. An arrangement for processing desired and undesired signals occurring in a frequency bandwidth $m\beta/n$ wherein $m/n$ is less than one comprising an amplifier of pass bandwidth $\beta$ for amplifying said signals to derive first signals, a plurality $n$ of channels having incremental bandwidths $\beta/n$ which are dimensioned in frequency to cover in their aggregate said bandwidth $\beta$, said channels responsive to said first signals to limit the amplitude of those components of said first signals having an amplitude above that of said desired signals to produce second signals, means for vectorially adding said second signals to derive third signals, means for limiting the amplitude of those components of said third signals having an amplitude above that of said desired signals to produce fourth signals, and an amplifier of said pass bandwidth $m\beta/n$ for amplifiying said fourth signals to derive resultant output signals.

6. In combination, an arrangement for processing desired and undesired signals occurring in a given frequency bandwidth, a plurality of channels having incremental bandwidths which are dimensioned in frequency to cover in their aggregate said given bandwidth, said channels responsive to said signals to limit the amplitude of those components of said signals having an amplitude above that of said desired signals to produce first signals, means for vertorially adding said first signals to derive second signals, means for limiting the amplitude of those components of said second signals having an amplitude above that of said desired signals to produce third signals, and an amplifier of the bandwidth of desired signals for amplifying said third signals to provide resultant output signals.

References Cited in the file of this patent

UNITED STATES PATENTS

| | | |
|---|---|---|
| Re. 23,440 | Earp | Dec. 18, 1951 |
| 2,416,895 | Bartelink | Mar. 4, 1947 |
| 2,450,818 | Vermillion | Oct. 15, 1948 |
| 2,766,325 | Di Toro | Oct. 9, 1956 |
| 2,777,059 | Stites | Jan. 8, 1957 |
| 2,787,673 | Cutler | Apr. 2, 1957 |
| 2,808,508 | Sinninger | Oct. 1, 1957 |
| 2,918,575 | Porter et al. | Dec. 22, 1959 |